United States Patent [19]

Giraud

[11] 4,215,421
[45] Jul. 29, 1980

[54] DATA-PROCESSING SYSTEM WHICH PROTECTS THE SECRECY OF CONFIDENTIAL DATA

[75] Inventor: Georges J. L. Giraud, Le Vesinet, France

[73] Assignee: Compagnie Internationale pour l'Informatique CII-Honeywell Bull (Societe Anonyme), Paris, France

[21] Appl. No.: 912,855

[22] Filed: Jun. 5, 1978

[30] Foreign Application Priority Data

Jun. 7, 1977 [FR] France .............................. 77 17436

[51] Int. Cl.[2] .......................... G06F 1/00; H04L 9/02; G08B 29/00
[52] U.S. Cl. .................................... 364/900; 178/22; 340/149 A
[58] Field of Search ... 364/200 MS File, 900 MS File; 340/149 R, 149 A; 178/22; 179/2 DP, 2 CA

[56] References Cited

U.S. PATENT DOCUMENTS

| | | | |
|---|---|---|---|
| 3,764,742 | 10/1973 | Abbott et al. | 340/149 A X |
| 3,806,882 | 4/1974 | Clarke | 364/200 |
| 3,962,539 | 6/1976 | Ehrsam et al. | 178/22 |
| 3,984,637 | 10/1976 | Caudill et al. | 340/149 R X |

*Primary Examiner*—Raulfe B. Zache

*Attorney, Agent, or Firm*—Kerkam, Stowell, Kondracki & Clarke

[57] ABSTRACT

A data processing system is provided which protects the secrecy of confidential data at the stages where it is formulated and transmitted to a card (first auxiliary member) having a code key thereon. The data processing system includes a data-processing machine having a device or terminal for transmitting data, including confidential data, and a plurality of first members auxiliary to the machine which are each intended to receive the confidential data from the transmitting device via the same transmission line and to process this confidential data. The transmitting device includes a plurality of second auxiliary members which correspond to respective ones of the first auxiliary members. Each pair of corresponding first and second auxiliary members include respective generators for generating first and second code keys and the system includes a means for causing one of the first code keys to correspond with one of the second code keys. One of the pair of corresponding first and second members includes modulating means to mix the confidential data with the code key corresponding to the said members of that pair to form a combined signal, while the corresponding members of the other pair include a demodulating means which reacts to the code key which has been made to correspond and to the said combined signal to reconstitute the said confidential data.

15 Claims, 14 Drawing Figures

DATA-PROCESSING SYSTEM WHICH PROTECTS THE SECRECY OF CONFIDENTIAL DATA

BACKGROUND OF THE INVENTION

1. Field of the Invention

This invention relates to a data-processing system which protects the secrecy of confidential data.

2. Description of the Prior Art

Any data processing system includes a data-processing machine connected to an apparatus for transmitting data to the machine. Of these systems, some are intended to process data made up of both data of a routine nature and confidential data. In such systems the confidential data is generally used to authorize the dialogue between the machine and the operator via the said data-transmitting apparatus. Specific examples of typical systems will be described herein by way of example; however, for a better understanding of the problems of prior art systems and approaches to solutions of these problems, reference may be had to applicant's copending application, Ser. No. 905,453, corresponding to French application 77-16098 and copending application, Ser. No. 900,503, corresponding to French application 77-12781, both of which are assigned to the assignee of the present invention.

A first example of systems of this nature is provided by systems which comprise a data processing machine that includes a member intended to process a predetermined confidential item of data generally referred to as a code key or more simply as a key. To prevent any illicit use of the system, the code key is changed regularly. In such a system, the operator first has to transmit an item of confidential data corresponding to the code key, via the data transmitting device of the machine, to the member which holds the key. If they are the same the member authorizes a dialogue between the machine and the operator for data of any kind, be it confidential or otherwise.

To avoid any misunderstanding in the remainder of the description, what is termed confidential data will be the data which is used as a key to open the dialogue between the machine and the operator. Also, the said member which holds the code key will be referred to below as the auxiliary member, in particular because of its function in the system and its interchangeable nature.

A second example of a known system relates to systems which employ credit cards. In cases where the credit cards contains only the personal code key of the cardholder, these systems are similar to those of the previous example, and the auxiliary member is formed by each of the various credit cards. It is known, however, that the trend is towards introducing an integrated circuit device into cards to record the operations which take place, such as, for example, crediting and/or debiting. In such systems, the auxiliary member thus no longer processes simply the confidential data, but also certain of the items of data passing between the machine and the operator.

In all these systems, it may be noted that the keyboard available to the operator is used to transmit both confidential data intended for the auxiliary member and also data intended for the machine after the auxiliary member has authorized a dialogue. The keyboard is thus a public device at the disposal of a large number of people, but can only be used to good effect after the correct confidential item of data or key has been transmitted. Thus, it is possible for an unauthorized user to use either the keyboard or the space which separates the keyboard from the auxiliary member to discover the confidential item of data or key which an operator will subsequently transmit to the auxiliary member.

In the case of the first example, assuming the key has been discovered, it will then be possible for the unauthorized user to gain direct access to the machine. In the case of the second example, the unauthorized user will have to steal a card from an operator who meets his requirements. With the introduction of cards incorporating circuits particularly to record credit and/or debit operations performed at a remote banking terminal or at the cashdesks of shops, theft of cards containing a key is expected to become a greater problem.

In all the systems which have just been discussed, the secrecy of the confidential data has so far been protected at the auxiliary member. In the system of the first example, the key is changed regularly, and in the systems cited in the second example, either a limited number of attempts is allowed for transmitting the confidential data or else the card or the integrated circuit device embodies means to prevent anybody from discovering the confidential data or key contained in the card. However, the unauthorized user still has the opportunity of working via the keyboard or via the space which separates the keyboard from the machine.

SUMMARY OF THE INVENTION

A primary object of the present invention is to protect the secrecy of confidential data in data-processing systems.

A data-processing system according to the invention is of the kind which comprises a data-processing machine provided with a device for transmitting data, including confidential data, and a plurality of first members auxiliary to the machine which are each intended to receive the confidential data from the transmitting device via the same transmission line and to process this confidential data. The transmitting device includes a plurality of second auxiliary members which correspond to respective ones of the first auxiliary members. Each pair of corresponding first and second auxiliary members include respective generators for generating first and second code keys and the system includes means for causing one of the first code keys to correspond with one of the second code keys. One of the pair of corresponding first and second members includes modulating means to mix the confidential data with the code key corresponding to the said members of that pair to form a combined signal, while the corresponding members of the other pair include a demodulating means which reacts to the code key which has been made to correspond and to the said combined signal to reconstitute the said confidential data.

Consequently, the principle of the invention lies in using the code keys to modify the confidential data passing along the transmission line in a manner which is designed to prevent extracting the confidential data combined with the keys by any process of deduction. The code keys are thus intended to scramble the data intended to pass along the transmission line which separates the keyboard from the first auxiliary member, which latter may be, for example, a credit card incorporating an integrated circuit device to record the operations which the operator wishes to perform with the machine. To prevent the code key from being deduced by logic, the key is different each time the operator has access to the machine with the same card, by virtue of the transmission of the aforementioned reference signals. Secrecy is thus protected in the space which separates the keyboard from the card.

Advantageously, steps are also taken to give each second member means for at least forming the confidential data. In other words, the principle of this feature lies either in separating the functions of the transmitting device, the infeed of the confidential code being performed by means of a second auxiliary member which is given to every person who may have access to the processing system, while the other functions are still performed by a public transmitting device, or else in producing the complete public transmitting device in the form of an auxiliary member which is given to every person who wishes to have access to the processing system. A description of an embodiment of second auxiliary member of this nature will be found in the aforementioned copending application for patent, Ser. No. 900,503, and corresponding French application 77-12781, filed in france on Apr. 27, 1977, the subject matter of which is hereby incorporated by reference.

In summary, the invention provides the operator with a system which guarantees that his confidential code is kept secret at the stages where it is formulated and transmitted to the card (first auxiliary member), where the received code will be processed to validate or not to validate access by the operator to the machine. Consequently, by combining the advantages of the invention with those of the prior art, which consisted in making each credit and/or debit card a member capable of preserving the secrecy of the confidential data which it contained and of confidentially processing external data with its confidential data, the invention now leaves the criminal with no means of discovering the confidential code recorded in the auxiliary member and of taking the place of the person concerned to gain access to the data processing machine.

BRIEF DESCRIPTION OF THE DRAWINGS

The features and advantages of the invention will be clearly apparent from the following description, which is given with reference to the accompanying drawings wherein like parts throughout the several views are identified by the reference characters. In the drawings:

FIG. 8 is a schematic block diagram of an embodiment of second auxiliary member according to the invention;

DESCRIPTION OF THE PREFERRED EMBODIMENTS

Figure 1:
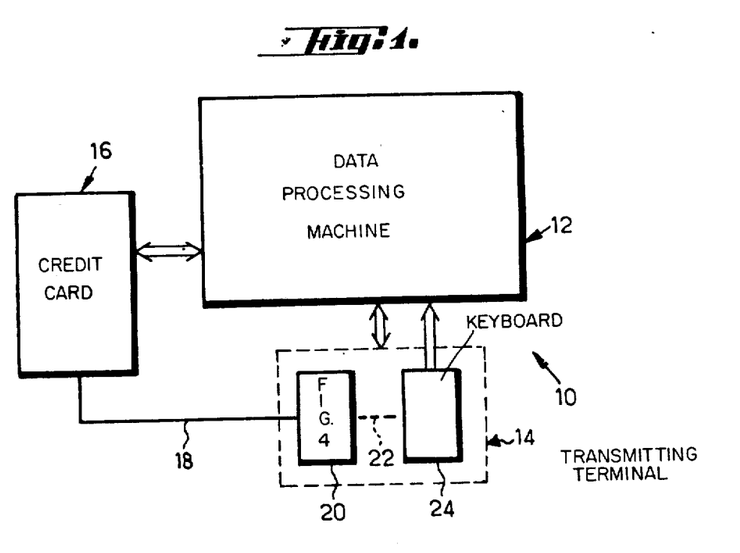
FIG. 1 is a general block diagram illustration of a data processing system which is intended to allow the object of the invention to be defined.

FIG. 1 illustrates the principle of the invention. In this figure, the data processing system 10 comprises a data processing machine 12 provided with a terminal device 14 for transmitting data which includes confidential data. The system includes a first member 16 auxiliary to the machine 12 which is intended to receive the said confidential data from the device 14 via a transmission line 18 and to process this confidential data. As stated above, the processing of the confidential data in the auxiliary member 16 authorizes or does not authorize a dialogue which may take place, generally speaking, between the machine 12, the device 14 and the auxiliary member 16 in the case of routine data, as shown by the two-headed arrows in FIG. 1.

The system 10 which has just been described represents a prior art system. In this system the transmission line 18, which includes the device 14, is at the disposal of anyone who is able to have access to the system 10 and may provide such a person with the opportunity of inserting electronic bugging means into it to discover the code which validates operation of the machine 12 by member 16.

The principle of the invention consists firstly in protecting the secrecy of the confidential code when it is travelling from the transmitting device 14 to the first auxiliary member 16 which may be a credit card via the transmission line 18. To this end, each first auxiliary member 16 which includes a keyboard has associated with it a second auxiliary member 20 which also includes a keyboard and the purpose of which is to receive the confidential code and to combine it with a predetermined code key so that the signal travelling along line 18 is useless to a criminal.

The second auxiliary member 20 is able to receive confidential code from a "public" keyboard 24 at the disposal of persons permitted to have access to the system 10, as indicated by the path shown in FIG. 1 by the broken line 22. However, to prevent illicit use being made of this public keyboard, an advantageous feature of the invention lies in the separation of the functions of the public keyboard as regards transmitting confidential data and data of a routine nature. Thus, the keyboard function which is concerned with formulating the confidential code will preferably be performed by a keyboard incorporated in the second auxiliary member 20, while the routine data will travel from the apparatus 14 to the machine 12 or to the first auxiliary member 16 from the public keyboard 24. What this feature amounts to is obviating the need for the connection 22. Nevertheless, this does not rule out the extreme case in which each member 20 replaces the whole of the device 14, the keyboard of this member then being used for all the transmission functions alloted to the apparatus 14.

Given that each pair of members 16 and 20, which is characteristic of a specific operator, is intended to be used a predetermined number of times, an unauthorized user could use this pair for his own ends if the possibility is open to him of deducting the components of the combined signals which travel along the transmission line 18. If the same key were used for each operation, it would ony be necessary to steal member 16 from its holder and apply to it the constant signal which passes each time between the members 20 and 16, which could have discovered to enable the unauthorized user to take the place of the holder of the said pair of members.

The present invention overcomes these disadvantages by introducing into the member 16 a means for generating a plurality of reference signals each of which define a code key. This reference signal is transmitted by line 18 to member 20, which determines the key to be used in conjunction with member 16. Each operation thus involves a new key, defined by the reference signal, which is designed in such a way that no logical deduction can preferably be made as to the keys from the signals in line 18. Member 20 will obviously include a modulator intended to combine the code key defined by the reference signal with the confidential code to form a combined signal which once transmitted, is demodulated in member 16 to reconstitute the confidential code.

These features will become clearer in the light of the following description.

Figure 2:
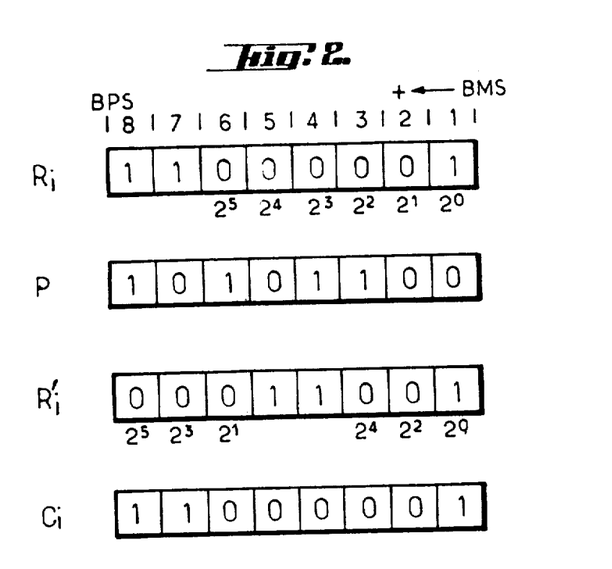
FIG. 2 is an explanatory diagram illustrating a way of generating a code key in accordance with the present invention.
Figure 3:
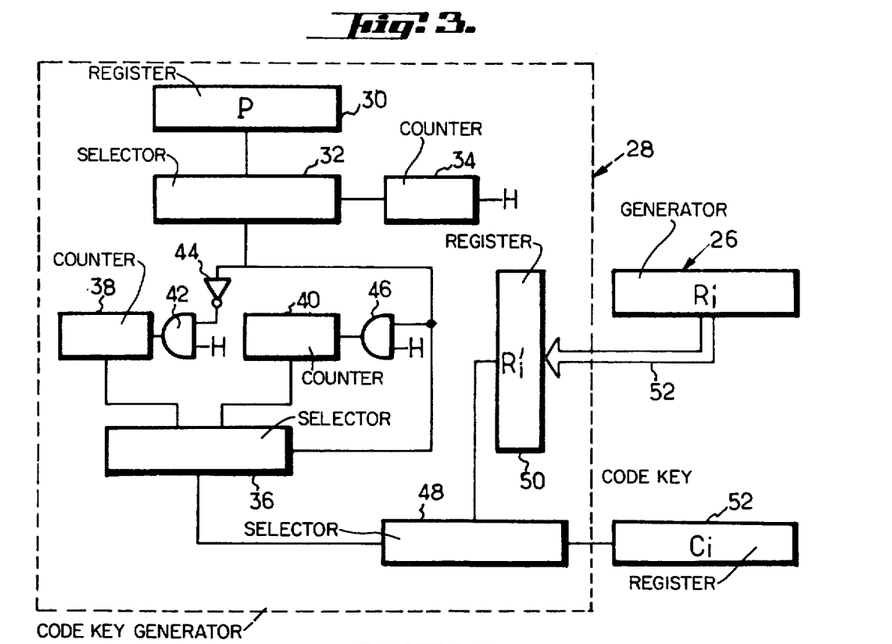
FIG. 3 is a block diagram illustration of a key generator which employs the principles of the invention illustrated by FIG. 2.

FIGS. 2 and 3 illustrate a possible way of generating keys which satisfy the conditions stated above.

In accordance with a feature of the invention, which is illustrated in FIGS. 2 and 3, each code key is defined by a function of a reference signal R and of a polynomial P which characterizes the pair of auxiliary members 16 and 20. Member 16 includes a means for generating a plurality of reference signals $R_a$ to $R_n$. This generator is marked 26 in FIG. 3, in which 28 is the code key generator. The polynomial P characteristic of a pair of members 16 and 20 is assumed to be fixed. The code key is serial position i ($C_i$) generated in members 16 and 20 is a predetermined function f of the fixed polynomial P and of the reference signal in serial position i ($R_i$) emitted at the time of operation i. In other words, $C_i = f(P, R_i)$.

Referring to FIG. 2, it will be assumed that each reference signal R and the polynomial P are octets. Each reference signal R is coded on six bits (64 possible numbers), the other two bits of the octet being set at 1, for example. In the case illustrated, the reference signal $R_i$ is made up, reading (right to left) from the least significant bit (BMS) to the most significant bit (BPS) of the bits 10000011. Reading in the same way, the value of the polynomial P is 00110101.

At a first stage, the order of the bits of signal $R_i$ is rearranged in accordance with a predetermined function f' to produce an intermediate reference signal $R'_i$. The function f' may take the form of wiring which produces an unvarying change in the order of the bits in the signals $R_i$, such as is shown by the positions written under the octets of signals $R_i$ and $R'_i$ in FIG. 2.

The intermediate reference signal $R'_i$ is then converted into the code key $C_i$ by using the following rule of composition. Progressing from the least significant bit to the most significant bit in the octet of the polynomial P, the digit positions of the octet of the key $C_i$ are filled in succession, from the least significant bit to the most significant bit, with the bits of the intermediate reference signal $R'_i$, being so filled in a different manner depending upon whether the bit in the corresponding position in the key polynomial P is 0 or 1. Assuming that the positive direction is that from the least significant bit to the most significant bit, going in the positive direction, there are transferred to the positions of the code key $C_i$, in the positive direction, the bits of the intermediate reference signal $R'_i$ in the positive direction when the bit of the polynomial P in the place corresponding to the said position is 0 and in the negative direction when this bit is 1. This gives Table A below in which, reading in the positive direction, the positions of the octet of the code key digits are referenced from 1 to 8 to the corresponding octet. $P_3$, for example, is the third digit in the octet P concerned in the positive direction.

TABLE A

| P | Direction | Transfer |
| --- | --- | --- |
| $P1 = 0$ | + | $R'1 \rightarrow C1$ |
| $P2 = 0$ | + | $R'2 \rightarrow C2$ |
| $P3 = 1$ | − | $R'8 \rightarrow C3$ |
| $P4 = 1$ | − | $R'7 \rightarrow C4$ |
| $P5 = 0$ | + | $R'3 \rightarrow C5$ |
| $P6 = 1$ | + | $R'4 \rightarrow C6$ |
| $P7 = 0$ | + | $R'5 \rightarrow C7$ |
| $P8 = 1$ | − | $R'6 \rightarrow C8$ |

This principle for generating the code key may be effected by a generator 28 as shown in FIG. 3. The key generator 28 includes a register 30 for the predetermined polynomial P which is coupled to a first selector 32. Selector 32 is controlled by a first forwards counter 34 operated by the clock signals H of the system. The output of the first selector 32 is applied to a second selector 36 operated by a second forwards counter 38 and a backwards counter 40. The input of forwards counter 38 is connected to the output of an AND gate 42 which has a first input which receives the clock signals H of the system and a second input which is connected to the output of the first selector 32 via an inverter 44. The input of the backwards counter 40 is connected to the output of an AND gate 46 which has a first input which receives the clock signals H of the system and a second input which is connected directly to the output of the first selector 32. The output of the second selector 36 controls a third selector 48 whose input is connected to the output of a register 50 for an intermediate reference signal $R'i$. As was seen above, the signal $R'i$ is formed from a reference signal Ri contained in Ri generator 26 by means of a predetermined link 52 which is designed to interchange the positions of the bits forming the reference signal Ri. The output of the third selector 48 is applied to the input of a register 52 for the corresponding key Ci. The output of this register forms the output of the key generator 28.

The operation of the key generator 28 is easily explained in the light of the principle illustrated in FIG. 2. The initial state of the generator 28 is represented by the counters 34 and 38 being set to zero while the backward counter 40 is set to 7, given that the signals are octets having eight positions 0 to 7.

The way in which the function represented by Table A above is applied is as follows. The positive direction (+) is alloted to the forwards counter 38 and the negative direction to the backwards counter 40, i.e. counter 38 counts in a forward direction and counter 40 counts in a backward direction. At each pulse of clock signal H, the counter 34 is incremented, so as to operate the first selector 32 at this rate. The direct link which exists between the selector 32 and gate 46 means that the backwards counter 40 is counted down at each clock pulse H when the bit of the polynomial P selected by the selector 32 is at the 1 level. Conversely, the inverter 44 operates the AND gate 42 to increment the counter 38 at each clock pulse H when the bit of the polynomial P selected by the selector 32 is at the 0 level.

Thus, the bits of the intermediate reference signal $R'_i$ are fed to the key register 52 by the selector 48, which, because of the signals which it receives from the selector 36 which is operated by counter 38 and backwards counter 40, performs the transfer indicated in Table A.

Table B below correlates the counts in the forward counters 38, 34 and the backward counter 40 when the transfer to be performed is that shown in Table A.

TABLE B

| H | 34 | 40 | 38 |
|---|----|----|----|
| 0(Initialization) | 0 | 7 | 0 |
| 1 | 1 | 7 | 1 |
| 2 | 2 | 7 | 2 |
| 3 | 3 | 6 | 2 |
| 4 | 4 | 5 | 2 |
| 5 | 5 | 5 | 3 |
| 6 | 6 | 4 | 3 |
| 7 | 7 | 4 | 4 |

Now that the generation of the keys has been explained, reference will be made to FIG. 4, which illustrates, in diagrammatic form, the main components involved in the auxiliary members 16 and 20, which are connected together by the transmission line 18.

Present in member 16 are the register 26 intended to contain the appropriate reference signal $R_i$, as well as the code key generator 28 and code the key register 52. In this embodiment each reference signal $R_i$ is obtained from a section ($\Sigma R_i$) reserved for all the reference signals in a memory 54 which the member 16 contains. The register 30 for the polynomial P is also formed by a part of memory 54. The output of the code key register 52 is fed back to its input and is applied to a first input terminal of a demodulator 56. Demodulator 56 has a second input terminal at which is applied the output of gate 58 which has its input coupled to line 18. Gate 58 is used to set a condition for the direction of the data permitted to travel towards the demodulator 56. The output of the demodulator 56 is applied to an input terminal of the comparator 60. Comparator 60 receives at a second input terminal the confidential data CI which has been prerecorded in memory 54. The output of comparator 60 is connected to GO/NO GO gate devices 62 and 64, which are intended respectively to validate and not to validate access to the machine 12 of the system. The output of register 26 is also connected to the input of a gate 67 which has its output connected to line 18 and which is intended to dictate the direction in which data is to flow between register 26 and line 18.

The second auxiliary member 20 on the other hand contains the same code key generator 28 as is illustrated in FIG. 3, associated with a register 26 for the reference signal $R_i$ and with a key register 52 as in the case of FIG. 3. The output of key register 52 is fed back to its input and is applied to an input of a modulator or mixer 66 which has another input connected to the output of a keyboard 68 which, in the case selected, is reserved for formulating the confidential data characteristic of the operator. The output of the modulator 66 is supplied to line 18 via a gate 70, which is intended to set the direction in which data is to pass between the modulator 66 and the line 18. This line is also connected to the register 26 in member 20 via another gate 72 which performs the same function as gate 66 of member 16.

Figure 4:
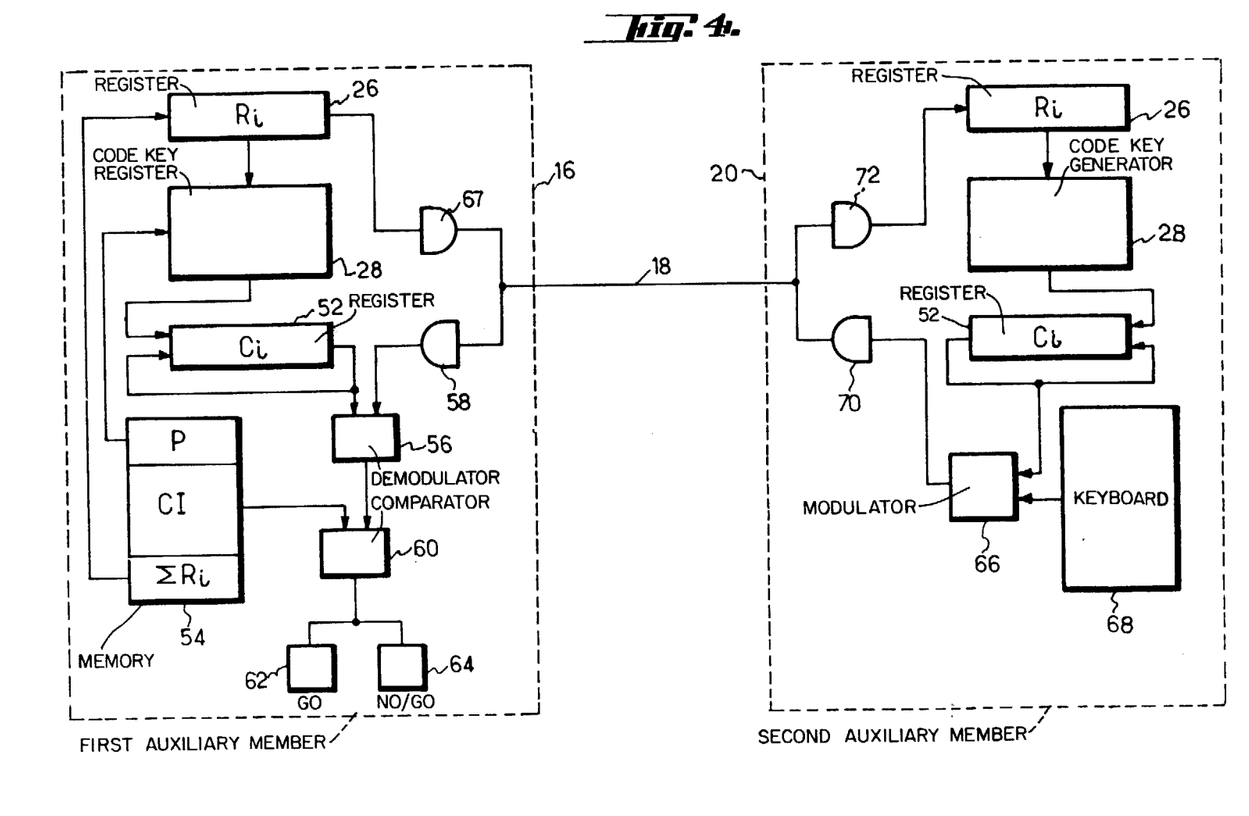
FIG. 4 is a block diagram illustration of first and second auxiliary members according to the present invention.

The operation of the system 10 in FIG. 1, as it relates to the members 16 and 20, shown in FIG. 4, is as follows:

In a first stage, a reference signal $R_i$ representing the number of the operation being performed is extracted from the memory 54 and, via register 26 and gate 66, is applied to line 18. The reference signal $R_i$ is received by gate 72 and fed into register 26 of a memory in second auxiliary member 20.

In a second stage, the code key $C_i$ is formed in members 16 and 20 in the manner described with reference to FIGS. 2 and 3. The key $C_i$ is applied to one input of the modulator 66.

Meanwhile, the operator has formulated an item of confidential data by means of the keyboard 68. This item of confidential data is applied to the other input of modulator 66. The modulator combines the key $C_i$ with the confidential data received from the keyboard 68 and transmits the combined signal to line 18 via gate 70.

The combined signal which is received by the first member 16 is passed on via gate 58 to one input of the demodulator 56. The other input receives the key $C_i$ from register 52. The demodulator 56 reconstitutes the item of confidential data formulated by the operator and applies this item to one input of a comparator 60. The other input of comparator 60 receives the predetermined item of condifential data CI from memory 54. If the two items of confidential data agree, validating device or gate 62 authorizes the operator to dialogue with the machine 12 through the public keyboard 24. If not, gate device 64 forbids such access.

The subsequent FIGS. 5 to 11 illustrate an embodiment of data processing system 10 whose auxiliary members 16 and 20 observe the operating principle described above.

Figure 5:
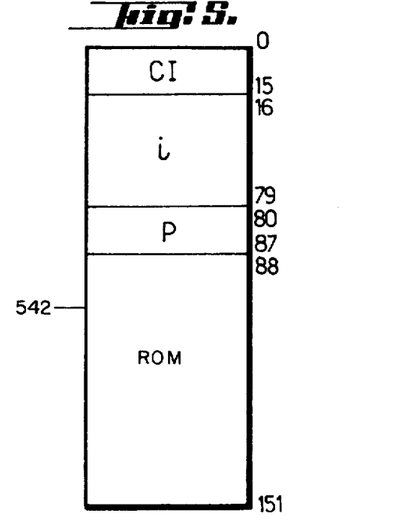
FIG. 5 shows a layout for the memory of the first auxiliary member shown in FIG. 3.

In these figures, the memory 54 shown in FIG. 4, is, for example, a programmable read-only memory whose structure is as shown in FIG. 5. In this memory, as required by the criteria given above, the predetermined confidential data recorded in the memory consists of sixteen bits 0 to 15 which occupy the first part of the memory. This is followed by the area for the reference signals R, which may occupy the sixty-four bits from 16 to 79. As an example, this area may initially be a succession of sixty-four bits of value 0 and each time a transaction of serial number i is completed, the bit concerned changes to a value of 1.

Following the reference signals, a zone of the memory is alloted to the eight-bit polynomial P, which thus occupies locations 80 to 87 in the memory.

Finally, the last zone of the memory is left for recording the results of each of the sixty-four transactions which the operator is able to perform with the system 10.

Figure 6:
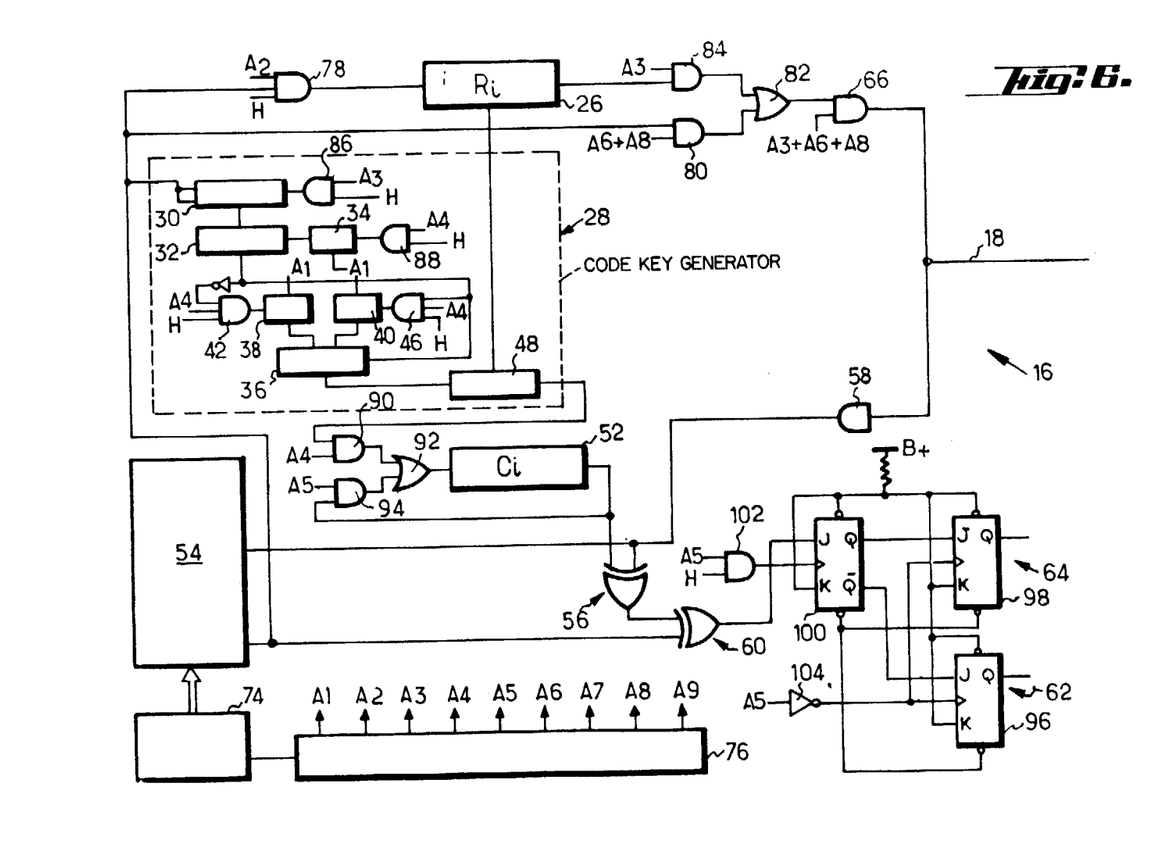
FIG. 6 is a schematic block diagram of an embodiment of first auxiliary member according to the invention.

FIG. 6 shows the detailed electronic circuit of a first member 16 which employs a memory 54 such as is shown in FIG. 5 as well as the main components shown in FIG. 4. Thus, there are again present the transmission line 18, the two gates 58 and 66, the register 26 for the reference signals, the key generator 28, the key register 52, the demodulator 56, which is formed in the present case by a NOR gate, the comparator 60, which is also formed by a NOR gate, and the validating and forbidding devices 62 and 64.

The memory 54 is associated with an address generator 74 which, in conventional fashion, designates the location to be read from or written to in memory 54. It is assumed that the memory 54 is organized into 2048 locations. The address generator 74 has its input connected to an output of a logic phase unit 76 which is designed to define nine phases A1 to A9 in the manner shown in FIG. 7. The phases are distinguished as follows: A1 is the initializing phase; A2 is the phase for transferring the reference signal $R_i$ to register 26; A3 is the phase for transferring the polynomial P to register 30 and also the phase for transmitting the reference signal Ri to the auxiliary member 20; A4 is the phase for generating the key $C_i$; A5 is the phase for receiving and comparing the confidential data which is transmitted from auxiliary member 20 via line 18; A6 is the phase of read-out from the transaction zone of the memory 54; A7 is the write phase for the transaction i resulting from the dialogue between the operator and the machine 12 of the system 10 according to the invention; A8 is a read-out phase for checking the transaction zone; and A9 is the phase of incrementing the second zone of the memory which contains all the reference values Ri corresponding to the numbers of all the transactions which the operator is permitted to perform with the card 16.

Figure 7:
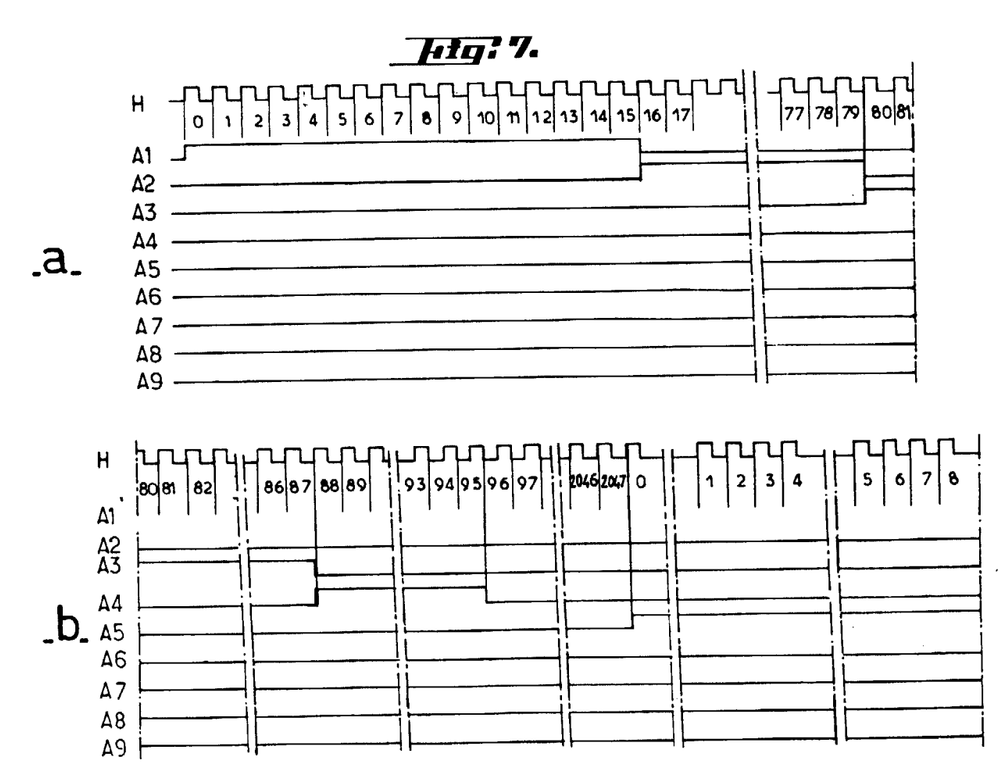
FIG. 7 comprises four sections a through d, each of which show waveforms which when joined end to end, show waveforms at various points in the circuit of FIG. 6 so as to enable the operation of the circuit shown in FIG. 6 to be more easily understood.

FIG. 7 shows that one complete transaction requires a number of operations to be performed at the memory, termed cycles, each cycle breaking down into a number of the said phases, as shown by Table C below.

TABLE C

| Cycles | Phases |
|---|---|
| C1 | A1 |
|    | A2 |
|    | A3 |
|    | A4 |
| C2 | A5 |
|    | A6 |
| C3 | A7 |
| C4 | A8 |
| C5 | A9 |

As dictated by the phases A1 to A9 produced by the logic unit 76, the circuit of the first auxiliary member 16 illustrated in FIG. 4 has been arranged in the manner shown in FIG. 6 in order to perform the task assigned to the member. In FIG. 6, it can be seen that the memory 54 has an input connected to the output of gate 58, and an output which is connected to the key generator 28 and also to the reference signal register 26 via AND gate 78. Gate 78 receives at its other two inputs the clock signals H of the system 10 and the phase signal A2. The output of memory 54 is also connected to one input of AND gate 80 which receives at another input a signal corresponding to the signal for phase A6 or A8, the OR function being designated by the + sign. The output of AND gate 80 is connected to an input of an OR gate 82 whose other input is connected to the output of the reference signal register 26 via an AND gate 84. Gate 84 has a second input which receives the phase signal A3. The output of OR gate 82 is applied to the input of a gate 66, having a second input intended to receive signal A3, or A6 or A8.

The key generator 28 is similar to that illustrated in FIG. 3, except for the fact that it includes an AND gate 86 which governs the register 30 for the polynomial P and wich receives the clock signals H of the system 10 and the phase signal A3. Another AND gate 88 governs the counter 34 which is also operated by the signal A1, AND gate 88 also receives the clock signals H and the phase signal A4. AND gates 42 and 46 similarly receive the clock signals H and the phase signal A4. The output of the third selector 48 is applied to the input of the key register 52 via an AND gate 90 and an OR gate 92. The AND gate 90 has a second input which is intended to receive the phase signal A4. The output of the key register 52 is applied to a second input of OR gate 92 via an AND gate 94 which has a second input connected to receive the phase signal A5.

The validating gate devices 62 and 64 are represented by respective ones of two JK flip-flops 96 and 98 which are controlled by a third flip-flop 100 which receives at its input the output signal from comparator 60. The validating signal for flip-flop 100 is given by the output of an AND gate 102 which receives the clock signals H and the phase signal A5, the latter signal also being that which validates the flip-flops 96 and 98, via an inverter 104.

FIGS. 6 and 7 and the explanation given above with reference to FIG. 4 show clearly how the card 16 operates. Consideration will therefore now be given to the circuit of the second auxiliary member 20 which corresponds to the first auxiliary member 16 shown in FIG. 6.

Figure 9:
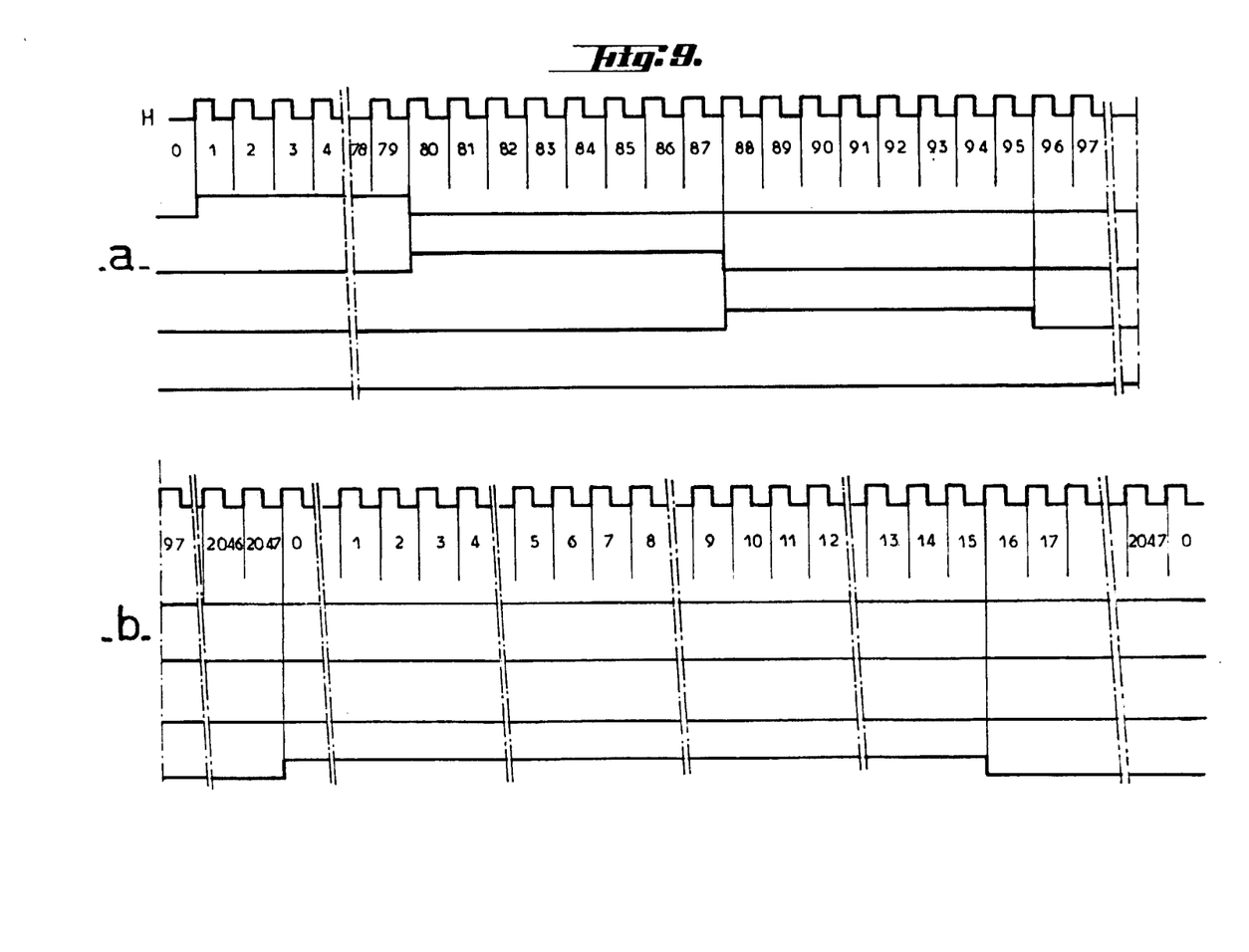
FIG. 9 comprises two sections a and b, each of which show waveforms which when joined end to end, show waveforms of various points in the circuit of FIG. 8, so as to enable the operation of the circuit shown in FIG. 8 to be more easily understood.

FIGS. 8 and 9 relate to the second auxiliary member 20. Obviously, the same components as are shown in FIG. 4 are aslo present in the member 20 in FIG. 8. Thus, there can again be seen the gates 72 and 74, the reference signal register 26, the code key generator 28, the key register 52, the modulator 66, which is formed in this case by a NOR gate, and the keyboard apparatus 68 for the operator to formulate the confidential data. As shown in FIG. 9, the four phase signals B1 to B4 are generated; B1 is the initializing phase for the auxiliary member 20; B2 is the phase for receiving the reference signal $R_i$ from the first auxiliary member 16 via line 18; B3 is the phase of generating the key $C_i'$ and B4 is the phase of transmitting the confidential data which has been formulated by the operator by means of the keyboard device 68. These phases are brought about, with reference to the clock signals H of the system 10, by a logic unit 106.

Figure 10:
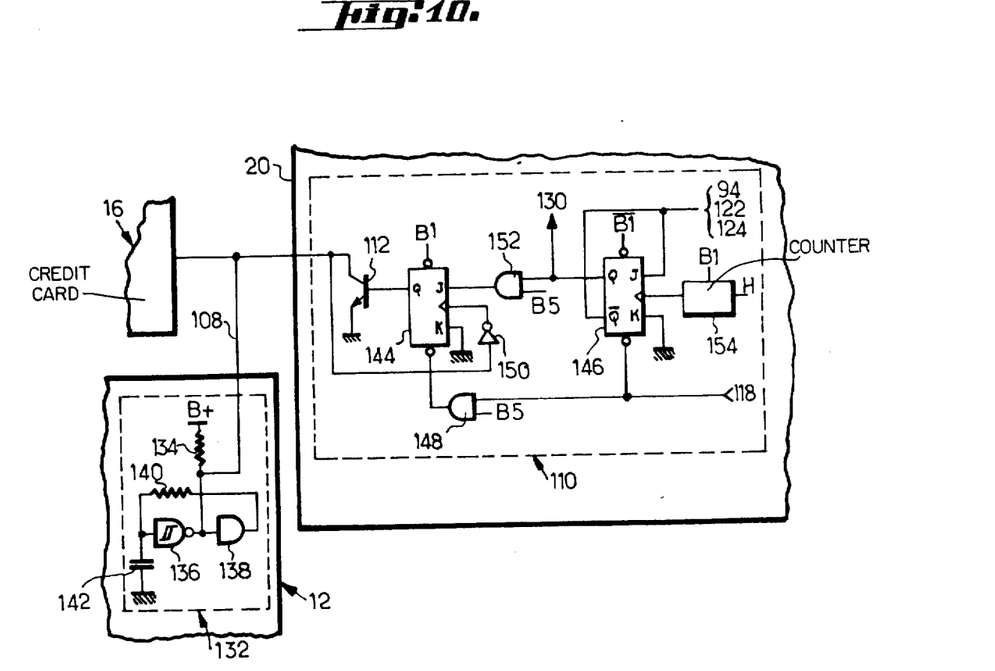
FIG. 10 is a schematic view of an embodiment of clock-controlling circuit arrangement employed in the auxiliary member shown in FIG. 8.

For reasons which will become clear in what follows, the clock signals H, which are emitted by the machine 12 of system 10 along a lead 108, are processed by a clock controlling arrangement 110, illustrated in greater detail in FIG. 10. The arrangement 110 contains in its output a short circuiting member 112 (a transistor in the embodiment illustrated) which is designed to interrupt the clock signals in the system where the transistor conducts. Briefly, the clock controlling arrangement 110 is intended to interrupt the clock signals of the system 10 while the operator is formulating the number representing the said confidential data. Th arrangement 110 will be described in greater detail below with reference to FIGS. 10 and 11.

The reference signal register 26 of the second auxiliary member 20 is governed by the output of an AND gate 114 which receives the clock signals H and the phase signal B2.

The code key generator 28 of FIG. 8 has a structure similar to that of the key generator 28 of the first member 16 shown in FIG. 6 and thus has the same reference numerals. However, the two forward counters 34 and 38 and the backward counter 40 are controlled by phase signal B1 rather than A1 and the gates 88, 42 and 46 receive phase signal B3 rather than A4.

The key register 52 of member 20 is associated in the same way as in member 16 with two AND gates 90 and 94 and one OR gate 92. AND gate 90 receives the phase signal B3 and AND gate 94 the phase signal B4. AND gate 74 also receives the phase signal B4 at its input.

The keyboard apparatus 68 includes a keyboard 116 having ten keys numbered 0 to 9 plus a validating key 118 which is connected to an input of the clock controlling arrangement 110. The numbered keys are connected to respective inputs of an encoder 120. This encoder converts the number punched out by the operator into a four-bit figure which represents the output of the encoder 120. The four-bit output figure is loaded into a register 122 via its inputs A to D, as described, for example, in my aforementioned French application 77 12781 (U.S. Ser. No. 900,503). The output $Q_D$ of register 122 is connected to the input of modulator 66. The clock controlling arrangement 110 emits a signal for validating the loading of register 122, this signal also being transmitted to a third input of the gate 94 associated with the key register 52 and to an AND gate 124 which receives the clock signals H on the input side and whose output is connected to the validating terminal of flip-flop 122 via an OR gate 126. This OR gate has another input which is connected to encoder 120 via a sampling device 128 and via an AND gate 130 whose other input is coupled to the output of the clock controlling arrangement 110. The J and K terminals of flip-flop 122 are grounded. The clock controlling arrangement 110 also receives the phase signal B1 and another phase signal B5 which will be defined below.

It has already been described how the second auxiliary device 20 is intended to operate according to the invention. The operation of the circuit shown in FIG. 8 may be more readily understood with the help of FIG. 9 and the explanation which will now be given in respect to clock controlling arrangement 110 with reference to FIGS. 10 and 11.

As hereinbefore noted, the clock controlling arrangement 110 co-operated with the keyboard device 68. The device 68 may be associated with the public keyboard 24, but in the embodiment illustrated, it is assumed to be incorporated in the auxiliary member 20, in which case this auxiliary member may take the form of a card of the type described in the aforementioned Frnech patent application No. 77-12781 and corresponding U.S. application Ser. No. 900,503). However, this may be, the number of the key pressed by the operator is coded by the encoder 120 and the number so coded is loaded into register 122 by means of a sampling pulse which goes from encoder 120 to the clock terminal of register 122 via sampling device 128, AND gate 130 and OR gate 126. The operator is then able to validate the number which he has formulated by pressing the validating key 118, which notifies the clock controlling arrangement 110 of this transmission request. The clock controlling arrangement 110 is designed to allow teh figure contained in register 122 to be transmitted under the timing of the clock signals H of the system. This figure is released by means of AND gate 124 and OR gate 126. The function of the transistor 112 of the control arrangement 110 is to reduce to zero the clock signals H and to notify the first auxiliary member 16 and the machine 12 that the operator has not yet validated transmission of the figure which he has formulated. The clock signals H arrive, via lead 108, from the clock of the system 10, which in this embodiment is contained in the processing machine 12. However, the device 14 could equally well incorporate the clock.

In FIG. 10 is shown the part of the machine 12 which includes the clock 132 of the system, as well as the electronic circuit of the clock controlling arrangement 110 contained by the second auxiliary member 20.

The clock 132 consists of a source of operating voltage B+, a resistor 134 which has one end connected to this source, a hysteretic converter 136 having an open-collector output which is connected to the other end of the resistor 134, a gate 138 which has its input connected to the output of converter 136, a resistor 140 which connects the output of gate 138 to the input of inverter 136, and a capacitor 142 which connects the input of inverter 136 to the system earth. The output of clock 132 is formed by the said second end of resistor 134, to which is connected the clock lead 108. It should be noted that the machine 12 may also have a component identical to the clock 132, for example, to validate the apparatus 14 during the phase A7 involving the first auxiliary member 16.

Figure 11:
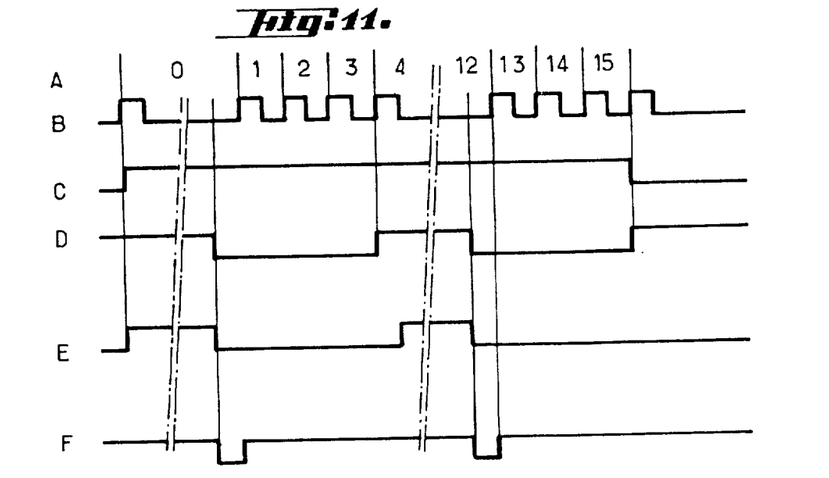
FIG. 11 shows waveforms to explain the operation of the circuit of FIG. 10.

The clock controlling arrangement 110 has, in addition to the transistor 112, two JK flip-flops 144 and 146 whose K terminals are both grounded. These flip-flops are controlled by the validating key 118 which is connected directly to flip-flop 146 and via an AND gate 148 to flip-flop 144. In addition to the phase signals B1 to B4, the logic unit 106 also forms a fifth phase signal B5, which is illustrated in FIG. 11 which shows that this signal is intended to last for the period during which the operator is punching out all the numbers of his confidential code, which represents the said confidential data. The phase signal B5 is applied to another input of AND gate 148. The Q terminal of flip-flop 144 is connected to the base of transistor 112. The flip-flops 144 and 146 are also respectively controlled by the phase signal B1 and a signal $\overline{B1}$ which is the invert of the latter signal. An inverter 150 connects the clock lead 108 to the validating terminal of flip-flop 144, while the J terminal of this flip-flop has applied to it the output of an AND gate 152 which has one input connected to the Q output terminal of flip-flop 146 and another input which receives the phase signal B5. The Q output terminal of flip-flop 146 is also the point of departure of a lead intended for AND gate 130 of the circuit in FIG. 8. The $\overline{Q}$ output terminal of flip-flop 146 is connected to its own J terminal and to AND gates 94 and 124 and register 122. Finally, flip-flop 146 operates under the control of a counter 154 which receives the clock signals H and the phase signal B1.

In FIG. 11, line A identifies the sixteen pulses which have to be produced to formulate an item of confidential information consisting of four 4-bit figures; waveform B represents the bits of these four figures; waveform C shows the form of the phase signal B5; waveforms D and E illustrate the states of the signals at the Q terminals of flip-flops 146 and 144 respectively, and waveform F represents the validating pulses.

Although a preferred embodiment of the invention has been illustrated and described, it will be apparent to those skilled in the art that various modifications thereof may be made without departing from the true spirit and scope of the invention. For example, the way of generating the code keys may be varied as desired, provided it meets the criteria mentioned when referring to FIGS. 2 and 3, namely that a knowledge of the successive combined signals passing between the same auxiliary members 16 and 20 along the transmission line 18 will not enable an unauthorized user to formulate a subsequent combined signal or the confidential data transmitted by the operator. The advantage of the method of generating the code keys which is described and illustrated lies in the fact that it is based simply on a polynomial P which is characteristic of each pair of auxiliary members 16 and 20 and that the code keys are formulated as a function of the reference signals received.

In addition, although the keyboard of the device 68 of each auxiliary member 20 is part of this member to allow confidential data to be written (the other data coming from the public keyboard 24 which is then independent of the auxiliary members 20), it may equally well be formed by the said public keyboard 24 and the link 22 which is shown in broken lines in FIG. 1.

It should also be noted that the recording in the memory of the first auxiliary member 16 of the results of the operations performed by the machine 12 of the system 10 at the instructions of the operator means that this member is of necessity consumable. The second auxiliary member, however, may be retained if the new member 16 includes the same polynomial P as the previous member 16.

It is advantageous for the members 16 and 20 to be cards or boards each incorporating an integrated circuit device.

It may also be mentioned that the functions of the first and second auxiliary members may be transposed.

Generally speaking, the invention is in no way restricted to the examples described and illustrated and indeed covers all means constituting technical equivalents, as well as combinations thereof if the combinations are made within the spirit of the invention and if they are employed within the scope of the following claims.

I claim:

1. A data processing system comprising a data-processing machine having means associated therewith, via a transmission line, for transmitting data, said data being of the type which includes confidential data, and a plurality of first members auxiliary to the machine, each said members being adapted to receive at least the said confidential data from the said transmitting means via the same transmission line and to process this data, said transmitting means being connected to a plurality of second auxiliary members corresponding to respective ones of the first auxiliary members, each pair of corresponding first and second auxiliary members including respective generators for generating first and second code keys, generator means for generating a reference signal for bringing one of the said first code keys into correspondence with one of the said second code keys, and one of the pair of said corresponding first and second auxiliary members including modulating means to mix at least the said confidential data with the code key corresponding to the said auxiliary member of that pair to form a combined signal, while the other auxiliary member includes a demodulating means which reacts to the key brought into correspondence from the said member to the said combined signal to reconstitute the said confidential data.

2. A data processing system comprising a data processing machine having means associated therewith for transmitting data via a transmission line, said data being of the type which includes confidential data, and 2 plurality of first members auxiliary to the machine, each said members being adapted to receive at least the said confidential data from the said transmitting means via the same transmission line and to process this data, said first auxiliary members include means for generating a plurality of reference signals, means for generating first code keys respectively corresponding to the said reference signals, and a means which reacts to the said reference signals for transmitting one of these reference signals to the said transmission line, said transmitting means connected to a plurality of second auxiliary members corresponding to respective ones of the said first auxiliary members, each of said second auxiliary members including means coupled to the said transmission line to receive the said signal transmitted from the corresponding first auxiliary member, means in each second member for generating second code keys which are respectively identical to the said first code keys and which are connected to the means to receive each said corresponding reference signal, modulating means in each said second member to mix the said confidential data with that of the second code keys, which corresponds to the said transmitted reference signal, to form a combined signal, and means for applying the said combined signal to the said transmission line, and each first auxiliary member including means for coupling this member to the said transmission line to receive the said combined signal, and demodulating means which reacts to the first code key corresponding to the transmitted reference signal and to the received combined signal to reconstitute the said confidential data.

3. A system according to claim 1 or 2, wherein the second means for generating second code keys includes a generator for generating predetermined data and means for combining this data with the said transmitted reference signal in accordance with a predetermined function.

4. A system according to claims 1 or 2 wherein the first and second code key generating means are identical.

5. A system according to claims 1 or 2 wherein the said first and second auxiliary members each include a keyboard for formulating at least the said confidential data.

6. A system according to claim 5, wherein the transmitting means consists of a keyboard accessible to the public for transmitting the said data, other than that capable of being formulated by the keyboard of the said second auxiliary members.

7. A system according to any of claims 1 or 2 wherein the transmitting means includes a keyboard connected to each of the second auxiliary members.

8. A system according to claim 3 wherein the means for combining the said predetermined data with the said transmitted reference signal in accordance with a predetermined function comprises a first selector (32) connected to a register containing said predetermined function, a first forward counter governed by the clock signals (H) of the said system, and being connected to control said first selector (32), a second forward counter (38), means for connecting said second forward counter (38) to the said first selector, said means comprising an inverter (44) followed by an AND gate (42), means for applying the said clock signals to said AND gate (42), a backward counter (40), means for connecting the backward counter (40) to the output of the first selector, said last named means comprising another AND gate (46) having the said clock signals H applied thereto, a second selector (36), means for connecting the second selector to the second forward counter (38), to the said backwards counter (40) and to the output of the first selector (32), and a third selector (48) connected to the output of the second selector (36) and which receives data derived from the said reference signal.

9. A system according to claim 8 wherein each of the aforesaid second auxiliary members includes clock-controlling means for validating the transmission of figures formulated by an operator with the said data transmitting means.

10. A system according to claim 3 wherein the first and second key generating means are identical.

11. A system according to claim 4 wherein the said first and second auxiliary members each include a keyboard for formulating at least the said confidential data.

12. A system according to claim 11 wherein the transmitting device consists of a keyboard accessible to the public for transmitting the said data, other than that capable of being formulated by the keyboard of the said second auxiliary members.

13. A system according to claim 3 wherein the transmitting means includes a keyboard connected to each of the second auxiliary members.

14. A system according to claim 13 wherein the means for combining the said predetermined data with the said transmitted reference signal in accordance with a predetermined function comprise a first selector connected to a register containing said predetermined function, a first forward counter governed by the clock signals of the said system and being connected to control said first selector, a second forward counter, means for connecting said second forward counter to the said first selector, said means comprising an inverter followed by an AND gate, means for applying the said clock signals to said AND gate, a backward counter, means for connecting the backward counter to the output of the first selector, said last named means comprising an AND gate having the said clock signals applied thereto, a second selector, means for connecting the second selector to the second forward counter, to the said backwards counter and to the output of the first selector, and a third selector connected to the output of the second selector and which receives data derived from the said reference signal.

15. A system according to claim 14 wherein each of the aforesaid second auxiliary members includes a clock-controlling means for validating the transmission of figures formulated by an operator with the said data transmitting device.

* * * * *